April 16, 1968  J. C. GARRETT ET AL  3,378,145
GAUGE NEST
Filed Nov. 1, 1966
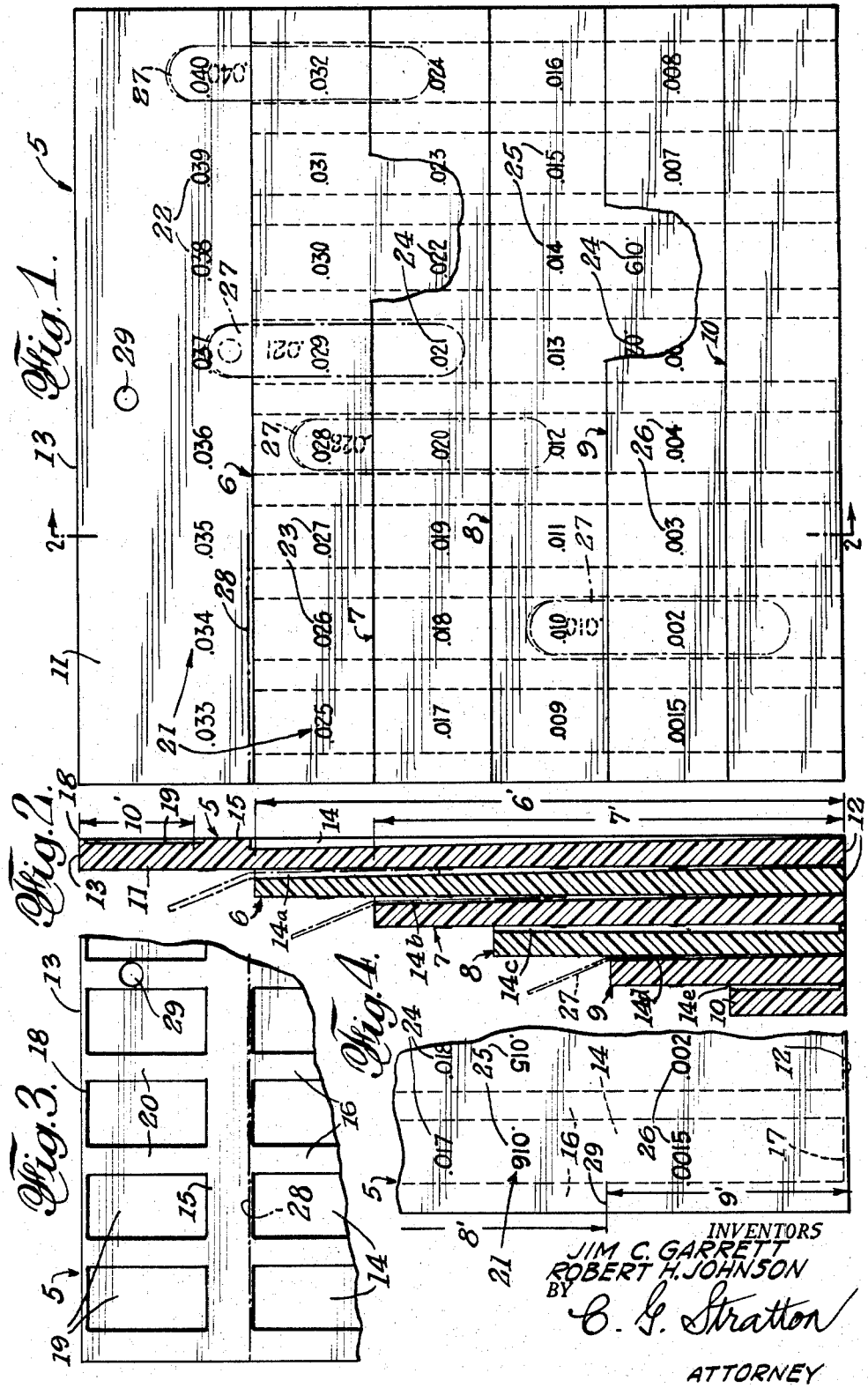
INVENTORS
JIM C. GARRETT
ROBERT H. JOHNSON
BY
C. G. Stratton
ATTORNEY United States Patent Office 3,378,145
Patented Apr. 16, 1968

3,378,145
GAUGE NEST
Jim C. Garrett, Inglewood, and Robert H. Johnson, Long Beach, Calif. (Both of 8060 Salt Lake Ave., Huntington Park, Calif. 90255)
Filed Nov. 1, 1966, Ser. No. 591,214
6 Claims. (Cl. 211—60)

ABSTRACT OF THE DISCLOSURE

This invention relates to a tiered nest or rack for storing a large number of feeler gauges in a tiered arrangement so the same are readily available and as easily replaced in the nest or rack. The device is advantageously made of molded plastic and comprises a plurality of plastic components, each of a different height, but all comprising portions of the highest or back component. Thus, molding costs are kept to a minimum since but the members that comprise the back components are the only ones that are molded, the other members of each nest comprising portions of said molded members.

Brief summary of the invention

The nest comprises a rack that may be hung up, stood upright or laid flat. It is a laminated structure of several flat components, all of the same width and, starting with a back component, each successive component is of lesser height than the one on which it is disposed. All of the components extend from a flat base surface toward the opposite edge of the back component so that their opposite edges are preferably uniformly spaced from the lowermost edge toward the opposite face of the back component.

Each component, on one surface thereof, is provided with a series of uniform and uniformly spaced parallel grooves. These grooves are defined between lands of a flat rear surface.

These components comprise the mentioned back, which is a master unit of maximum height, and a plurality of successively shorter sections that are cut from and, therefore, comprise a portion of said master unit. When the components are assembled, as above indicated, with the bottom edges forming a flat base, and with the grooved faces of the shorter sections in contact with the ungrooved faces, application of either heat or adhesive and pressure will cause the components to fuse together into a solid unit in which the upper exposed ends of the grooves constitute slots that are receptive of feeler gauges of conventional form. A full complement of such gauges will be arranged in tiers with their ends extending from the grooves.

In the present case a five-tiered nest is shown with eight grooves across, providing accommodation for forty gauges, each different in feeler thickness. To guide the location of the gauges in their grooves, the ungrooved, front faces of the components are provided with numbers representing the thickness of the feelers that belong in the grooves immediately below the respective numbers.

Since only one form of component, the back component requires to be molded and the other components are cut from such flat molded members, the present gauge nest, although several times as thick or deep as a back component, is inexpensively produced in relation to gauge nests of such undesired thick form. Moreover, much difficulty would be encountered to provide the gauge-accommodating seats or slots in such thick moldings. It is an object of this invention to inexpensively produce multi-tiered banks of recesses in a compact arrangement wherein the successive tiers are set back from the front of the nest.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

Detailed description of the invention

In the drawing, like reference characters designate similar parts in the several views.

FIG. 1 is a front elevational view of a nest for a plurality of feeler gauges, portions thereof being broken away.

FIG. 2 is a typical vertical sectional view as taken on the line 2—2 of FIG. 1.

FIG. 3 is a fragmentary rear view.

FIG. 4 is a fragmentary front face view of the back component of the nest.

The gauge nest that is illustrated comprises, generally, a back component 5, and a plurality of components, 6, 7, 8, 9 and 10, in a laminar arrangement, the component 6 being of lesser height than the back component 5 and each of the other components, succesively, being similarly shorter than the component that backs it. The components are preferably made of high impact, rigid plastic.

The back component 5 is a basic element, each of the other components comprising a shorter section of such a basic element. In this case, the five components 6 to 10 together with the back component 5 make up a six-layer structure.

The component 5 is shown as comprising a rectangular (in this case, square) plate 11 of uniform thickness. One face of said plate, from its bottom edge 12, and extending toward the top edge 13, is provided with a set of eight uniformly spaced grooves 14 that terminate at a transverse rib 15 and are spaced by lands 16 all of the same width. Said grooves are shown as of uniform width. As best seen FIG. 2, the grooves 14, from their upper ends at the rib 15, become gradually shallower toward the edge 12 where a narrow transverse rib 17 terminates said grooves. A similar transverse rib 18 is provided along the top edge 13, a set of shallow recesses 19, longitudinally aligned with the grooves 14, extending between the ribs 15 and 18 and spaced by lands 20 that are longitudinally aligned with the lands 16.

On the opposite face of said plate 11 a complement of legends 21, representing thickness dimensions, is provided in the form of raised numerals. For the six-component gauge nest that is illustrated, five lines 22, 23, 24, 25 and 26 of such numerals are provided. It will be noted that the lines of numerals 22, 23, 24 and 26 are right side up, the first three lines being vertically similarly spaced and the lines 24 and 26, as seen in FIG. 4, being vertically double spaced. The line 25, as in the latter view, has its numerals inverted and its spacing between the lines 24 and 26 such that the spacing between lines 24 and 25 is half that of the spacing between lines 25 and 26. The forty gauge-thickness numbers vary in desired increments between a maximum to a minimum from the right numeral in line 22 to the left numeral in line 26.

In order to form the component 6, the top portion of a plate 11 is cut off to leave a plate to a height 6', as shown in FIG. 2. Since this cut is made at the topmost end of the set of grooves 14, the component will have a set of grooves 14a that has the maximum size at the top. Thus, when the component 6 is placed with the lands 16 thereof against the front face of the component 5 and with both edges 12 thereof aligned, there will be defined a tier of eight sockets of a size to freely accommodate either end of the eight feeler gauges 27 that are the thickest of the full complement of forty gauges. So positioned, said sockets have the numerals of line 22 on the back component directly above them and designating the thickness of the gauges disposed in the respective sockets. The component 6 will cover the lines of numerals 23 to 26 on the back component, but will show said lines of numerals on its front face.

The component 7 is similarly formed by cutting off the upper end of a plate 11 to leave a plate to a height 7' which is shorter, in this case by an inch, than the component 6. The component is placed with its lands 16 against the front face of the component 6 and its lower edge 12 in register with the edges 12 of the components 5 and 6. The upper edge of the component, therefore, has a line or tier of sockets that are of less size, front to back, since the mentioned cut was made nearer the tapered ends of grooves 14 to leave grooves 14b that are smaller, as indicated, than the grooves 14a.

The component 8 is formed by cutting a plate 11 at two places, one on line 28, slightly above the line of cut used to produce the component 6, and another on a line 29 between the lines 25 and 26 of the numbers 21, thereby leaving a plate having a height 8' and having on its front face the lines of numerals 23, 24 and 25. The portion of the plate between the line of cut 29 and the edge 12 of the height 9' and having the line of numbers 26 on its front face, forms the component 9.

By first turning component 8 end for end so that the line of numerals 25 is right side up, regardless that the lines of numerals 23 and 24 are upside down, and placing it against the front face of the component 7, a third tier of sockets 14c is provided, the same bearing relation to the line of numerals 24 on the component 7.

The component 9, placed against the front face of the component 8, forms a fourth tier of sockets 14d which bear relation to the line of numerals 25 on the component 8.

Finally, by cutting off a portion 10' of a top portion of plate 11 that has already been cut to form either of the components 6, 7 or 8, the component 10 is formed, the recesses 19 in said portion 10' forming a fifth tier 14e of gauge sockets when the lands 20 of said portion are placed against the front face of the component 9. These sockets are related to the numerals in line 26 of said component 9.

Upon fusing the contacting portions of the components, the laminar arrangement thereof is joined as an integral mass enabling handling the device as an inarticulate unit.

The hole 29 by which the device may be hung, may be formed at any time before or after assembly of the components.

It will be noted that, although the gauge nest that is shown comprises six components, the same may be made up of one basic component 11 and three other such basic components by cutting the same in the manner above described.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A gauge nest structure comprising:
   (a) a laminar arrangement of flat-plate components that, from front to back, comprises successively shorter components and the top edges of the components, forward of the back component, defining upwardly and rearwardly stepped tiers,
   (b) each of said forward components having a set of vertical grooves in the rearward face thereof and terminating at each respective top edge in a set of feeler-gauge holding pockets, and
   (c) said components being formed of plastic material that, under application of either heat or adhesive and pressure applied to the front and back faces of the structure fuses together engaging faces of the components.

2. A gauge nest acording to claim 1 in which:
   (a) the back component is provided with a set of vertical grooves in the rear face thereof,
   (b) each of the forward components comprising a section that is removed from a plate of the form, size and characteristics of the back components, the mentioned grooves in the forward components comprising comparable sections of the grooves in said plate.

3. A gauge nest according to claim 2 in which at least two of the forward components comprise different sections of a single plate.

4. A gauge nest according to claim 3 in which two other forward components comprise different sections of a second single plate, the four components being of different height.

5. A gauge nest according to claim 4 in which:
   (a) a complement of numerals representing different gauge thicknesses is provided on the front face of the back component,
   (b) the front faces of the shorter components, thereby, having similar numerals according to the different sections of the single plates of which the latter components are formed,
   (c) said complement of numerals being arranged in lines that have registering relation to the pocket-forming grooves in said shorter components.

6. A gauge nest according to claim 5 in which one line of numbers is in upside down relation to the other lines, the shorter component bearing the latter line, before being embodied in the laminar arrangement being turned end for end to bring the initially inverted line of numerals right side up.

References Cited
UNITED STATES PATENTS

| | | | |
|---|---|---|---|
| 2,303,971 | 12/1942 | Willy et al. | 211—50 |
| 2,995,256 | 8/1961 | Schoenfisch | 211—60 |
| 3,012,348 | 12/1961 | Smith | 211—50 XR |
| 3,198,340 | 8/1965 | Tokash | 211—55 XR |

ROY D. FRAZIER, *Primary Examiner.*

W. D. LOULAN, *Assistant Examiner.*